(12) United States Patent
Thomas et al.

(10) Patent No.: US 9,046,321 B2
(45) Date of Patent: Jun. 2, 2015

(54) RIFLE SCOPE HAVING ELEVATION AND WINDAGE ANGLE ADJUSTMENT AND MEASUREMENT ASSEMBLY

(71) Applicant: KRUGER OPTICAL, INC., Tiggard, OR (US)

(72) Inventors: Mark A. Thomas, Sisters, OR (US); Mitchell Thomas, Sisters, OR (US)

(73) Assignee: Kruger Optical, Inc., Tiggard, OR (US)

( * ) Notice: Subject to any disclaimer, the term of this patent is extended or adjusted under 35 U.S.C. 154(b) by 0 days.

(21) Appl. No.: 14/307,441

(22) Filed: Jun. 17, 2014

(65) Prior Publication Data

US 2014/0290114 A1 Oct. 2, 2014

Related U.S. Application Data

(63) Continuation of application No. PCT/US2013/070930, filed on Nov. 20, 2013.

(60) Provisional application No. 61/728,520, filed on Nov. 20, 2012.

(51) Int. Cl.
| | |
|---|---|
| *F41G 1/38* | (2006.01) |
| *F41G 1/36* | (2006.01) |
| *G02B 23/02* | (2006.01) |
| *G02B 23/10* | (2006.01) |

(52) U.S. Cl.
CPC ....... *F41G 1/36* (2013.01); *G02B 23/02* (2013.01); *F41G 1/38* (2013.01); *G02B 23/10* (2013.01); *G02B 23/105* (2013.01)

(58) Field of Classification Search
CPC ............. F41G 1/38; F41G 3/06; G02B 23/00; G02B 23/02

USPC ................................. 102/119, 120, 121, 137
See application file for complete search history.

(56) References Cited

U.S. PATENT DOCUMENTS

| | | | |
|---|---|---|---|
| 4,364,628 A | 12/1982 | Garner | |
| 5,671,088 A * | 9/1997 | Mai et al. | 359/424 |
| 5,771,623 A * | 6/1998 | Pernstich et al. | 42/115 |
| 2009/0223107 A1* | 9/2009 | Lin et al. | 42/115 |
| 2012/0000979 A1 | 1/2012 | Horvath et al. | |
| 2012/0246992 A1 | 10/2012 | Peters et al. | |

FOREIGN PATENT DOCUMENTS

RU 2201574 C1 3/2003

* cited by examiner

*Primary Examiner* — Stephen M Johnson
(74) *Attorney, Agent, or Firm* — Timothy E. Siegel Patent Law, PLLC; Timothy E. Siegel

(57) ABSTRACT

A rifle scope, comprising: a scope housing and an optical train, supported in the scope housing and defining an optical axis having a pointing direction. Also, a pointing angle adjustment electrical user input device includes a first button having a first position that does not cause the pointing angle to change, and a second position that causes a progressive change in the pointing angle over time in a first direction. The user input device also includes a second button, also having a first position and a second position and wherein placing the second button in the second position causes the pointing angle to change over time in a second direction opposite to the first direction. Finally, the rifle scope includes an electric actuator, adapted to change the pointing direction, responsive to the user input device.

4 Claims, 5 Drawing Sheets

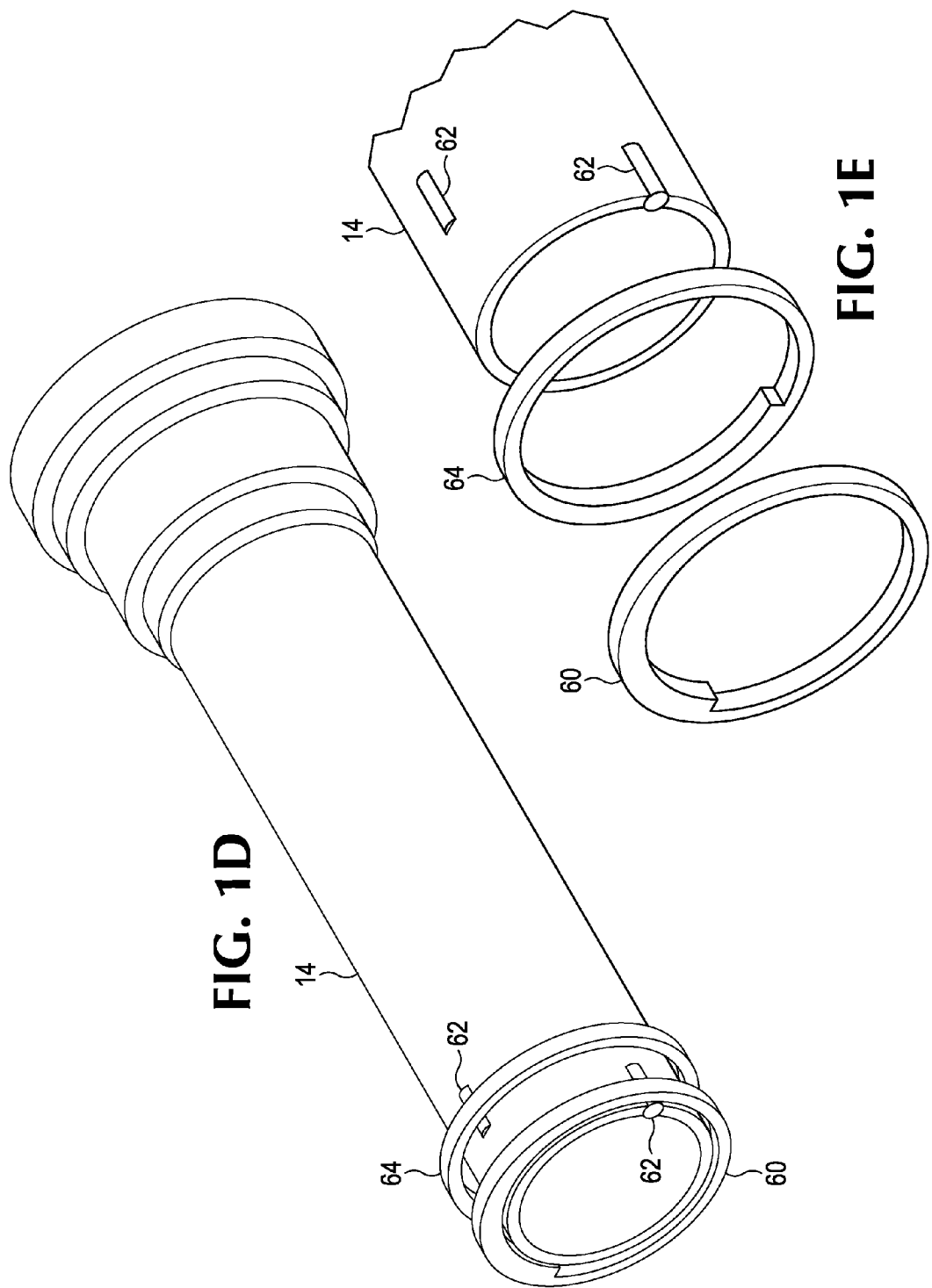

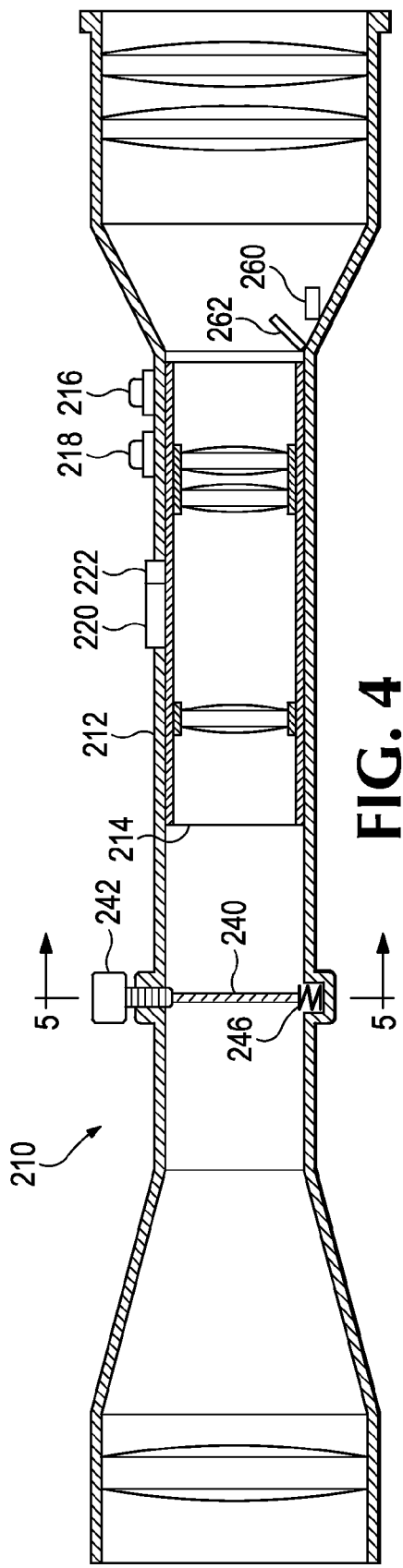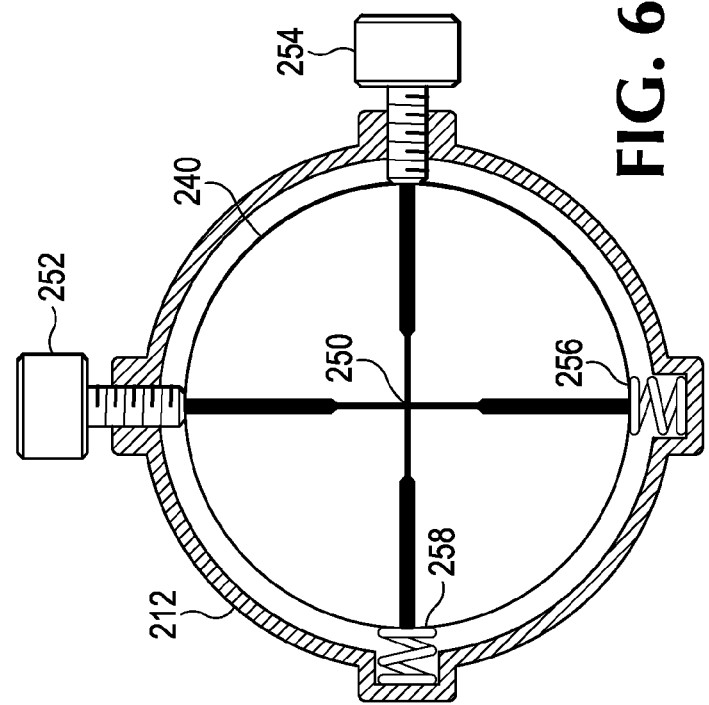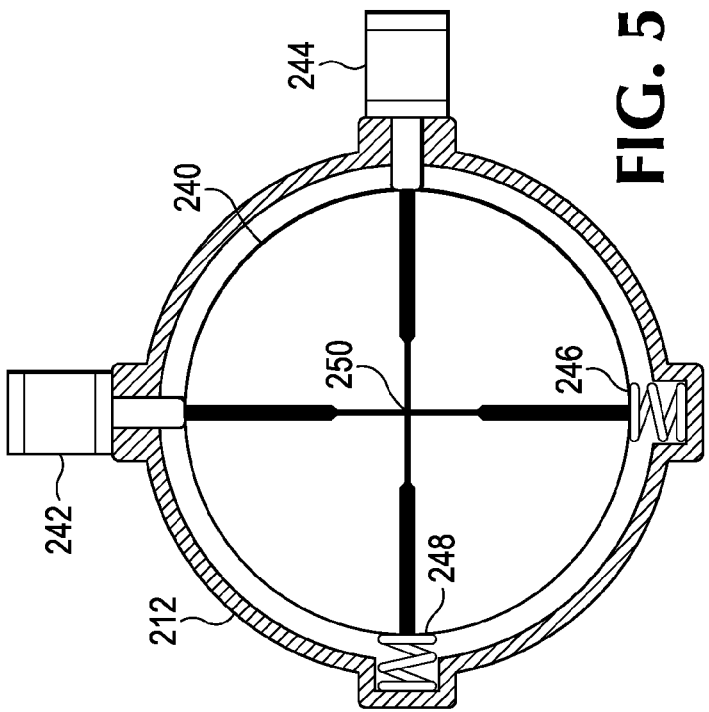

RIFLE SCOPE HAVING ELEVATION AND WINDAGE ANGLE ADJUSTMENT AND MEASUREMENT ASSEMBLY

RELATED APPLICATIONS

This application is a continuation of application serial number PCT/US/70930, filed on Nov. 20, 2013, which is incorporated herein by reference as if fully set forth herein, and which, in turn, claims priority from provisional application Ser. No. 61/728,520, filed Nov. 20, 2012, which is also incorporated by reference as if fully set forth herein.

BACKGROUND

Elevation and windage knobs have long been an important part of a rifle scope. The elevation knob causes the optical axis of the scope to point slightly downwardly, so that the shooter will point the rifle up, relative to how it would otherwise be pointed for the same position of the reticle on a field of view. The windage knob performs the same function for azimuth, so that a shooter can compensate for the presence of a crosswind. These knobs, however, do present shooters with some difficulties.

First, there is the problem always inherent in a mechanical linkage, of inaccuracy introduced by imperfections in the train of parts leading from the knob to the pivotably mounted optical element that is moved to adjust elevation and windage angle (collectively, "optical axis pointing angle"). There is an inevitable tolerance in each part, and some looseness in the system, which introduces uncertainty and inaccuracy into the pointing angle of the scope. These inaccuracies tend to be greatest at the far ends of the adjustment range. U.S. Pat. No. 6,862,832 does address this problem by introducing a system in which the pointing angle of the optical element is measured by an optical sensor. But neither this sensor, nor its mode of use, appears to be further described. Accordingly, the measurement accuracy provided cannot be determined. Further, it cannot be said that there is a thorough disclosure of implementation of a system with actual measurement of the optical element pointing angle.

Another problem encountered is that of knob over-rotation. Typically, both the elevation and windage knobs, in order to provide the shooter with both a full range and precision adjustment, can be fully rotated about three times. But this means that a shooter cannot determine, by simply viewing the knob, how far it has been rotated. Rather, he must remember how many rotations have been introduced. This can lead to a miss-adjustment, which that shooter might perceive only after missing a few shots.

Yet another problem is the need to leave shooting position to check pointing angle, either by removing one's eye from the scope ocular, or removing one's finger from the trigger to feel the knob position. Adjusting pointing angle is likely to cause an even greater interruption in the shot process.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention is a rifle scope having a front and a back, comprising a scope housing; an optical train, supported in the scope housing and defining an optical axis having a pointing angle, and having an eyepiece permitting user viewing of an image, at the back. Also, an elevation and windage angle adjustment assembly, includes: an elevation and windage angle adjustment user input assembly; and an actuator assembly that is adapted to introduce a change in the pointing angle at a predetermined point. In addition, an elevation and windage angle measurement assembly, includes: a laser assembly, positioned to emit a beam along the optical axis; and a 2-axis position sensor adapted to sense the beam and measure its position at a location separated by the predetermined point from the laser. Finally, a data processor is adapted to determine the pointing direction from the beam position measurement.

In a second separate aspect, the present invention is a rifle scope, comprising: a scope housing and an optical train, supported in the scope housing and defining an optical axis having a pointing direction. Also, a pointing angle adjustment electrical user input device includes a first button having a first position that does not cause the pointing angle to change, and a second position that causes a progressive change in the pointing angle over time in a first direction. The user input device also includes a second button, also having a first position and a second position and wherein placing the second button in the second position causes the pointing angle to change over time in a second direction opposite to the first direction. Finally, the rifle scope includes an electric actuator, adapted to change the pointing direction, responsive to the user input device.

In a third separate aspect, the present invention is a rifle scope, comprising a scope housing and an optical train, supported in the scope housing and defining an optical axis having a pointing direction a first image plane, wherein an inverted image of a field of view is formed; and having an ocular portion, adapted to present a re-oriented image of the field of view to a user. Also, a reticle disk coincident to the first image plane is adapted to present a reticle image superimposed on the re-oriented image of the field of view to the user. Finally, an elevation and windage angle adjustment assembly, includes an elevation and windage angle adjustment user input assembly and an actuator assembly including an orthogonal pair of piezoelectric actuators that move the reticle disk within the first image plane. This changes the position of the reticle image in the reoriented image of the field of view, and thereby changes the optical axis pointing direction in response to input from the user input assembly.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 1D is a perspective view of a rifle scope according to an additional alternative preferred embodiment.

FIG. 1E is an exploded detail view of a portion of the rifle scope of 1D.

FIG. 4 is a side sectional view of a rifle scope according to another alternative preferred embodiment of the present invention.

FIG. 5 is a cross sectional view of the rifle scope of FIG. 4, taken along line 5-5 of FIG. 4.

FIG. 6 is a cross sectional view of a variant of the rifle scope of FIG. 4, representing the same view as is shown in FIG. 5.

DETAILED DESCRIPTION OF THE PREFERRED EMBODIMENTS

Figure 1:
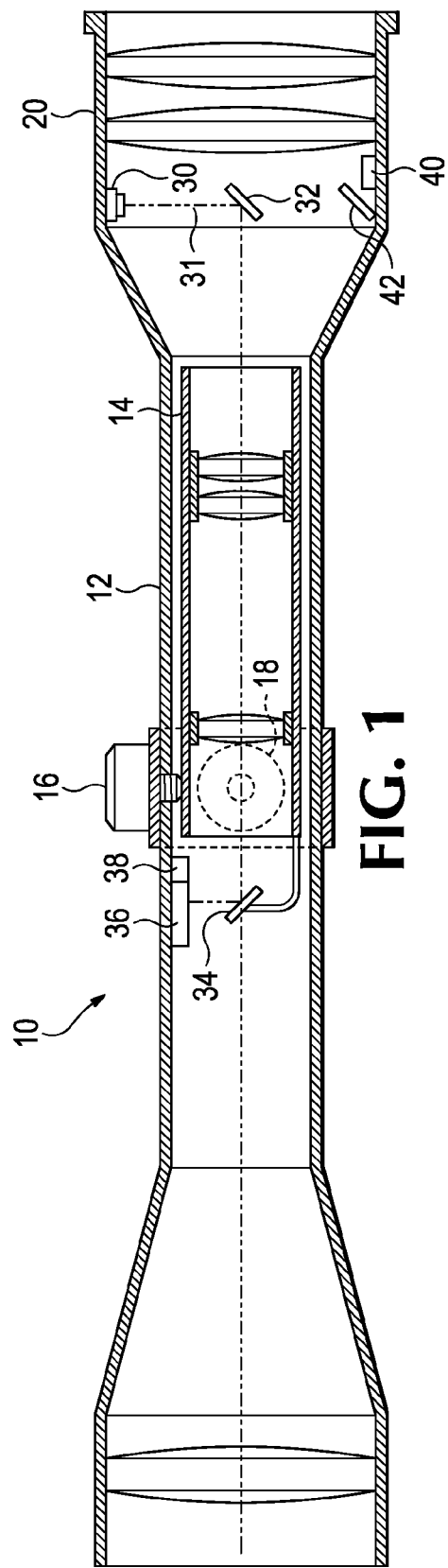
FIG. 1 is a side sectional view of a rifle scope, according to a preferred embodiment of the present invention.
Figure 3:
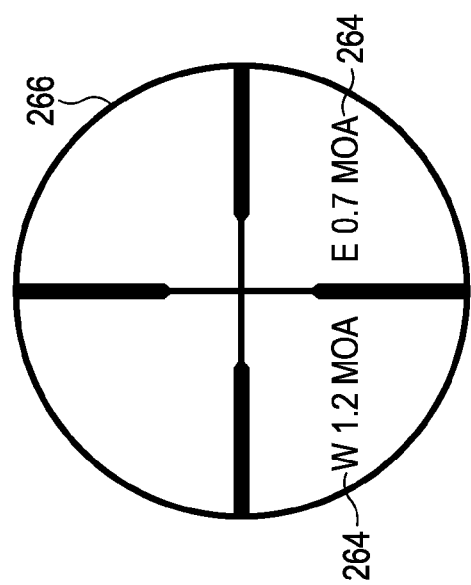
FIG. 3 is a view of the ocular lens of either the scope of FIG. 1 or the scope of FIG. 2, displaying windage and elevation angle.

Referring to FIG. 1, a first embodiment of a rifle scope 10 having ocular elevation and windage angle reporting, includes a housing 12, an erector tube 14, an elevation adjust knob 16, a windage adjust knob 18, and an ocular or eyepiece 20. To accurately measure erector tube pointing angle (which is also the optical axis of the scope), a laser 30 transmits a beam 31 onto a mirror 32, which in one preferred embodiment reflects light at the frequency of laser 30 and transmits light at all other frequencies. An erector tube mirror 34 is attached to the front end of the erector tube 14, to reflect the laser beam 31 at a right angle to a two-axis positioning sensor 36, which senses the location at which the laser beam 31 is striking it. A data processor 38 receives data from sensor 36 and uses it to compute elevation and windage angles of the scope optical axis. These angles are sent through a communicative link (not shown), which in one preferred embodiment is a conductive wire and in an alternative preferred embodiment is a fiber optic link, to a display mechanism 40, which projects the windage and elevation angles, in minutes of angle or milliradians, onto a mirror 42 which selectively reflects light of the frequency produced by display mechanism 40 and transmits other light. Mirror 42 reflects the display projected by mechanism 40 onto the lower portion of the field of view of a user looking through the scope eyepiece 20 as shown in FIG. 3.

There are a number of benefits to scope 10, relative to other scopes. First, a user need not remove his eye from the eyepiece 20, as he adjusts the elevation knob 16 or the windage knob 18, or both. Although some scope users may be adept enough to adjust elevation or windage or both to a desired angle, simply by feel, any large adjustment made using such a technique could be dangerously uncertain. The user with pointing angle feedback, directly in his field of view, has no need to take his eye off of the eyepiece 20, and can, as a result, adjust the elevation and windage angles while maintaining a bead on his quarry. This greatly reduces the amount of time needed to adjust the scope for a shot, thereby enhancing the possibility of shooting success.

Additionally, the mechanical linkages used to communicate positions of knobs 16 and 18 (according to standard prior art practice) introduce an error in adjustment from knob position to actual elevation and windage angles. For small adjustments, close to zero, these errors are relatively small, but for larger adjustments, the errors become larger as well. For scope 10, however, this does not matter, because the actual knob position does not matter. The angle is read directly by sensor 36, and this is what the user sees projected at eyepiece 20, and it is the figure to which he adjusts the knob. As this figure should be highly repeatable, the accuracy between the angle reported to the shooter and the actual angle differs only by measurement error, which is comparatively small relative to the mechanical error of the knobs 16 and 18 and the associated actuation train.

Figure 1B:
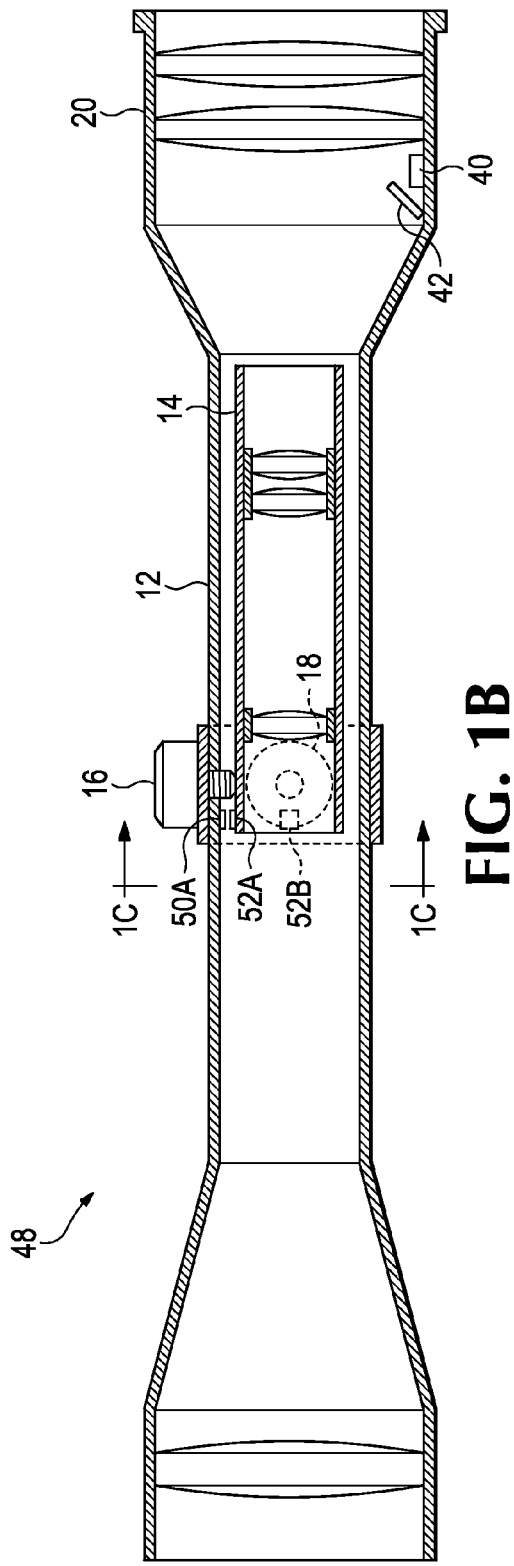
FIG. 1B is a side sectional view of a rifle scope, according to an alternative preferred embodiment.
Figure 1C:
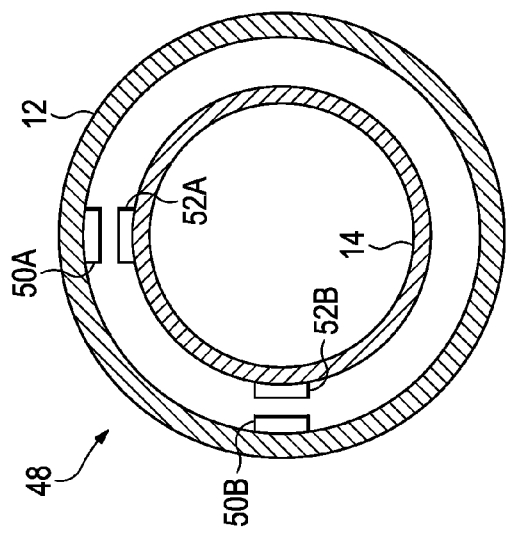
FIG. 1C is a cross-sectional view of the rifle scope of FIG. 1B taken along line 1C-1C.

An alternative preferred embodiment of a rifle scope 48 is shown in FIGS. 1B and 1C. Scope 48 is the same as scope 10, except for that the apparatus for measuring the pointing angle of erector tube 14 does not include the elements shown for scope 10, but rather includes a pair of location sensors 50A, 50B and 52A, 52B. In one preferred embodiment elements 50A and 52A are lasers and elements 50B and 52B are two-axis position sensors 36. In another preferred embodiment elements 50A and 52A are laser range finders (having an extremely short range) and elements 50B and 52B are reflective. In another preferred embodiment elements 50A and 52A are hall effect (magnetic) sources and 50B and 52B are hall effect sensors.

In an alternative preferred embodiment shown in FIGS. 1D and 1E, a cam or pair of cams 60 (only one shown) are used in conjunction with a positioning post or pair of posts 62 (only one shown), whereby the rotation of cam 60 pushes the front end of tube 14 into a different position. Cam(s) 60 are instrumented to provide position information for ocular display.

Figure 2:
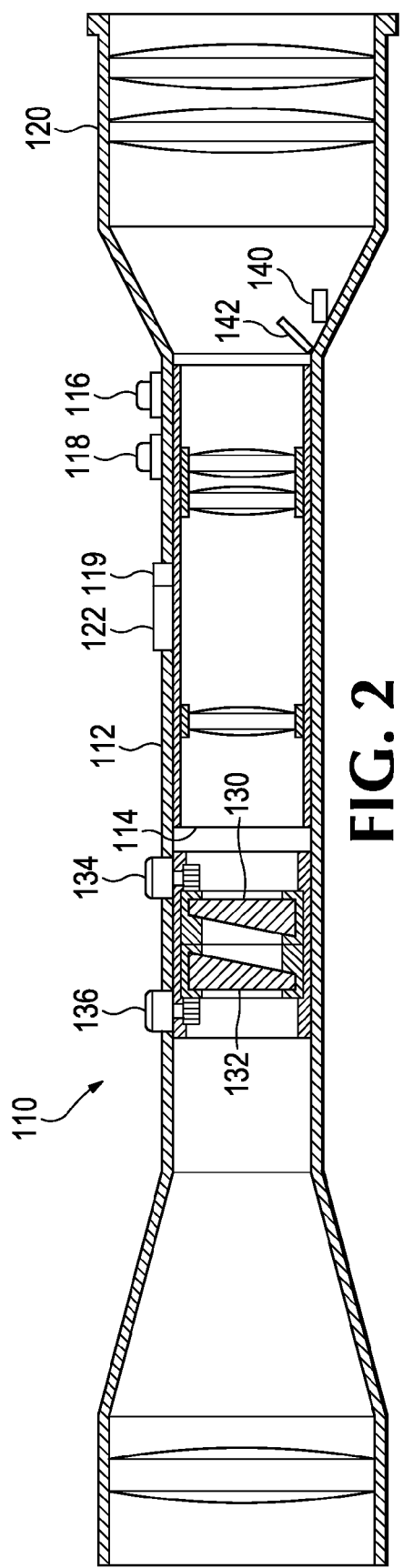
FIG. 2 is a side sectional view of a rifle scope according to an alternative preferred embodiment of the present invention.

Referring now to FIGS. 2 and 3, a rifle scope 110, includes a housing 112 and an erector tube 114. An elevation adjustment button 116 and a windage adjustment button 118 are electrically supplied by battery 119 and have outputs leading to a computer 122, which in response, computes the degree of rotation (around the axis of housing 112) for wedges 130 and 132 to create the windage and elevation angles indicated by buttons 116 and 118. In one preferred embodiment, angles indicated by buttons 116 and 118 are displayed by projecting mechanism 140, and reflected by specific frequency reflecting mirror 142, onto the field of view of a user looking through eyepiece 120, as shown in FIG. 3. Actuators 134 and 136 are commanded to rotate glass wedges 130 and 132 the amount indicated by actuator buttons 116 and 118. In one preferred embodiment encoding is placed on the exterior of the housing for wedges 130 and 132, so that the exact degree of rotation can be read by the actuators 134 and 136, thereby ensuring accuracy.

Similar to scope 10, the user of scope 110 does not have to remove his eye from the eyepiece in order to adjust windage and elevation angle. Moreover, in a preferred embodiment, the user can depress one of buttons 116 or 118 constantly to make an adjustment to the windage and elevation angles, an operation that is somewhat easier than turning a knob. In a preferred embodiment, buttons 116 and 118 may be depressed simultaneously. In one preferred embodiment a short press to a button 116 or 118 changes the direction of angle adjustment.

Referring to FIGS. 4 and 5, in yet another alternative preferred embodiment, a rifle scope 210, includes a housing 212 and an erector tube 214. Similar to scope 110, scope 210 includes an elevation adjustment button 216 and a windage adjustment button 218, which are powered by a battery 222 and which each send a signal to data processing unit 220. A reticle 240, having a crosshairs intersection 250, is positioned at the first image plane, and is position adjustable by way of elevation adjustment actuator 242 and a windage adjustment actuator 244 (FIG. 5), which are opposed by counter-springs 246 and 248, respectively. Actuators 242 and 244 are powered by battery 222 and are controlled by data processing unit 220, in response to input from windage and elevation control buttons 216 and 218.

Because the first image plane is inverted, moving the reticle to the right, will cause the image of the reticle to move to the left, causing a the scope and rifle to move to the right, relative to where it would have been without reticle adjustment, when the crosshair intersection 250 is aimed at a particular point. Actuators 242 and 244, collectively with data processing unit 220, a display mechanism 260 and a mirror 262, form a windage and elevation detection and reporting assembly. Display mechanism 260 and mirror 262 superimpose the windage and elevation angles 264 (FIG. 3), in minutes of angle, onto the ocular field of view 266 (FIG. 3).

FIG. 6 shows an alternative preferred embodiment to the scope of FIGS. 4 and 5, in which manual actuators 252 and 254, in the form of threaded elements opposed by countersprings 256 and 258, respectively, are used to move reticle 240 to a desired position. In one preferred embodiment, this embodiment also reports windage and elevation through the eyepiece, by having instrumentation that measure input into manual actuators 252 and 254. But in an alternative preferred embodiment, the exterior of actuators 252 and 254 are marked, so that a user can ascertain his elevation and windage adjustment by visually inspecting the exterior of actuators 252 and 254.

While a number of exemplary aspects and embodiments have been discussed above, those possessed of skill in the art will recognize certain modifications, permutations, additions and sub-combinations, thereof. It is therefore intended that the following appended claims and claims hereafter introduced are interpreted to include all such modifications, permutations, additions and sub-combinations as are within their true spirit and scope.

We claim:

1. A rifle scope having a front and a back, comprising:
 (a) a scope housing;
 (b) an optical train, supported in said scope housing and defining an optical axis having a pointing angle, and having an eyepiece permitting user viewing of an image, at said back;
 (c) an elevation and windage angle adjustment assembly, including:
  (i) an elevation and windage angle adjustment user input assembly;
  (ii) and an actuator assembly adapted to introduce a change in said pointing angle at a predetermined point; and
 (d) an elevation and windage angle measurement assembly, including:
  (i) a laser assembly, positioned to emit a beam along said optical axis;
  (ii) a 2-axis position sensor adapted to sense said beam and measure its position at a location separated by said predetermined point from said laser; and
  (iii) a data processor, adapted to determine said pointing direction from said beam position measurement.

2. The rifle scope of claim 1, wherein said optical train includes an erector tube having a front end that is pivotably mounted in said housing and wherein said actuator assembly pushes said front of said erector tube thereby changing said pointing angle of said optical axis.

3. The rifle scope of claim 2, wherein said measurement assembly includes a mirror attached to said front of said erector tube, said mirror positioned to reflect said laser beam onto said 2-axis position sensor.

4. The rifle scope of claim 1, wherein said laser assembly includes a laser mounted on an interior side of said housing and a frequency selective mirror that reflects the frequency of said laser beam but passes light of other frequencies, said mirror reflecting said laser beam through the center of said optical train.

* * * * *